United States Patent [19]

Garner

[11] 4,112,038

[45] Sep. 5, 1978

[54] METHOD FOR PRODUCING MOLDED ARTICLES

[75] Inventor: Lynn Thomas Garner, Wilmington, N.C.

[73] Assignees: Lowe Paper Company, Ridgefield, N.J.; Bolivia Lumber Company, Wilmington, N.C.

[21] Appl. No.: 719,756

[22] Filed: Sep. 2, 1976

[51] Int. Cl.² ............................................... B29C 3/02
[52] U.S. Cl. ............................ 264/138; 264/DIG. 69; 264/325
[58] Field of Search ......... 264/115, 37, 109, DIG. 69, 264/138, 325

[56] References Cited

U.S. PATENT DOCUMENTS

| | | | |
|---|---|---|---|
| 3,082,055 | 3/1963 | Mayer et al. | 264/37 |
| 3,574,050 | 4/1971 | Rice | 162/5 |
| 3,599,788 | 8/1971 | Fyfe | 209/11 |
| 3,607,999 | 9/1971 | Corbett | 264/37 |
| 3,671,615 | 6/1972 | Price | 264/115 |
| 3,718,536 | 2/1973 | Downs et al. | 264/257 |

Primary Examiner—Robert F. White
Assistant Examiner—James R. Hall
Attorney, Agent, or Firm—Nolte and Nolte

[57] ABSTRACT

A method of producing molded articles comprising taking a by-product from a main process, that by-product comprising a contaminated thermoplastic material impregnated with a fibrous material, usually paper and in some instances additionally a metallic foil, removing a portion of the fibrous material for re-use in the main process and thereafter heating and molding the remaining material to form an article. In instances where the thermoplastic material is not contaminated with a fibrous material, it may be considered desirable to introduce such material.

1 Claim, 8 Drawing Figures

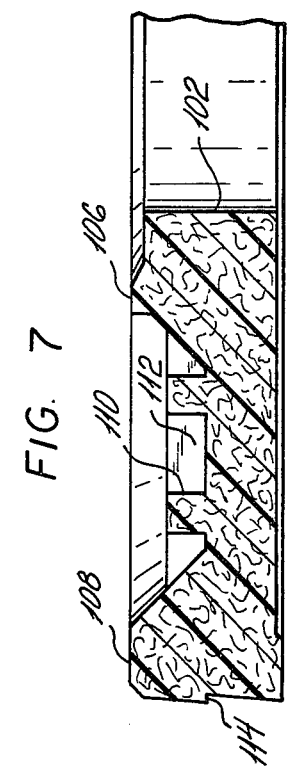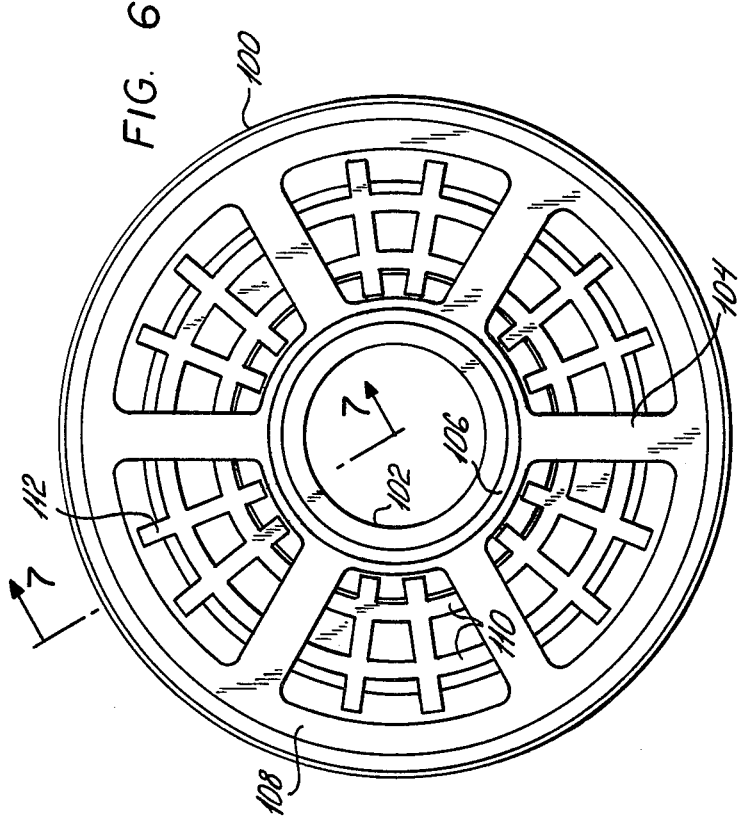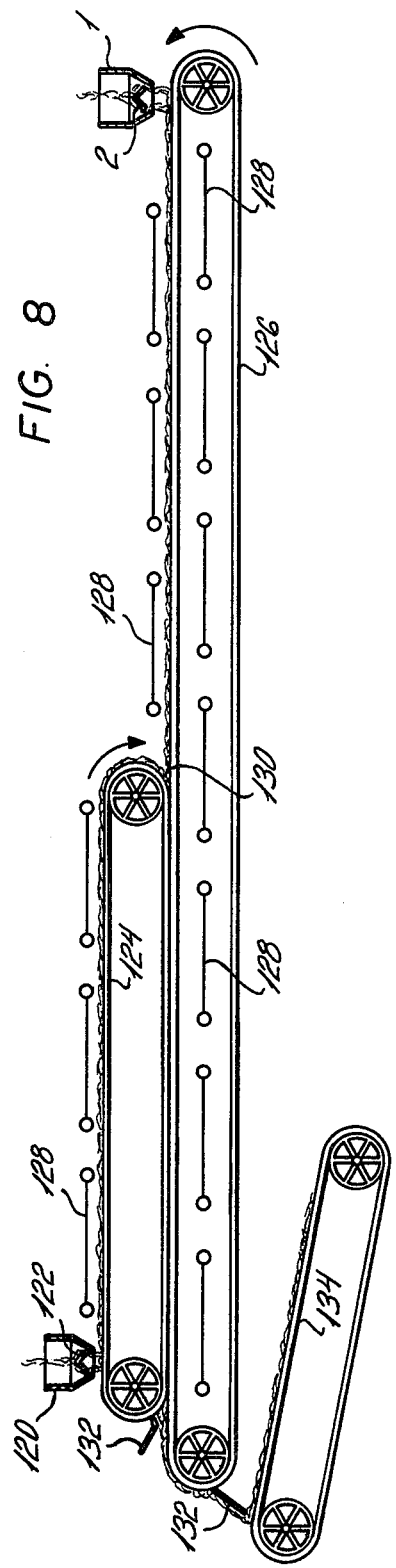

METHOD FOR PRODUCING MOLDED ARTICLES

BACKGROUND OF THE INVENTION

This invention is concerned with the production of molded articles and the invention is concerned with the production of molded articles from materials recovered as a by-product from a main process, such as waste derived from a process for making coated paper products.

It is current practice in the production of paper coated with synthetic plastic materials, which are commonly used for containers, such as milk cartons and drinking cups, to take the waste material and subject it to a treatment to recover as much as possible of the cellulose fiber and to re-use that fiber in a paper making process. A typical process for the recovery of such fiber from scrap or waste material is described in U.S. Pat. No. 3,574,050 issued Apr. 6, 1971 to John C. Rice the disclosure of which is incorporated herein by this specific reference. With that process, the material remaining after the fiber has been recovered comprises the synthetic plastic material impregnated with that portion of the fibers which cannot be removed and, in certain instances, also a metallic foil which is sometimes incorporated in the production of the coated or laminated paper products. In the past, this material has been discarded. The conventional methods of being rid of this waste material have been either burning, in which case the material is used as a supplementary fuel since it has a rather large caloric content, or it has been buried or used as land fill. It has generally not been considered possible to recycle the plastic material because it is contaminated with fiber and foil.

The present invention proposes that this material be utililzed to produce molded articles. It is also proposed that thermoplastic material contaminated other than with a fibrous material, such as that contaminated, for example, with dyestuffs and various other additives be uded to produce molded articles and in that production, fibrous material, preferably also a by-product, could be added for reinforcement.

BRIEF DESCRIPTION OF THE DRAWINGS

An embodiment of the present invention is illustrated, schematically, in the accompanying drawings, in which:

FIGS. 6 and 7 are plan and cross-sectional views, respectively, of a molded article according to this invention; and FIG. 8 is a detail of a variation according to the invention.

DESCRIPTION OF THE PREFERRED EMBODIMENT

Figure 1:
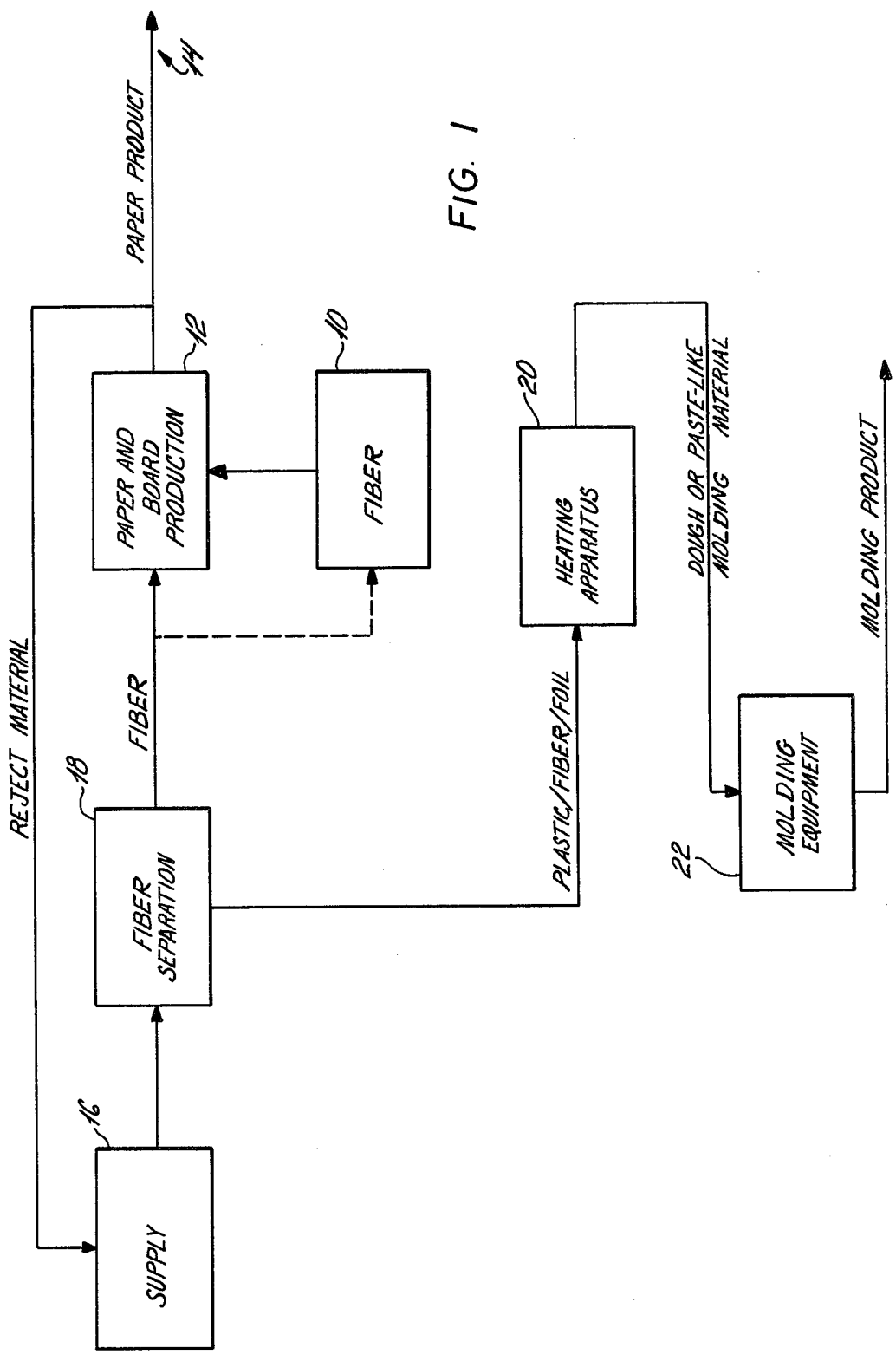
FIG. 1 is a flow chart illustrating the process according to this invention.

Referring to FIG. 1, there is illustrated a process for making a coated paper product which comprises a supply of raw fiber 10 which is delivered to a paper and board production line indicated schematically at 12 and which includes means for applying a primary synthetic plastic coating to the paper or board and a layer of a metallic foil to make a laminated paper product which issues at 14 for use. Reject or waste material from the process which may be faulty material, trim from the edges of the paper or board web and scrap remaining after blanks have been cut from the web is returned to a supply indicated at 16. From the supply 16 the reject material passes to a fiber separation process at 18 which conveniently is of the kind described in the aforementioned U.S. Pat. No. 3,574,058 in which the coated reject material is shredded and pulped and as much as possible of the fibrous content of the reject material, thus separated is passed to the production line 12 or is mixed with the supply of raw fiber at 10.

The remaining material which comprises the fiber which cannot be separated in process 18 and the separated synthetic plastic and foil material is then passed to heating apparatus 20 in which it is reduced to a dough or pastelike moldable consistency whence it is delivered to molding equipment at 22 for forming a desired product.

The heating apparatus may be the drum unit illustrated in FIG. 2 and described hereinafter, or the belt or oven unit of FIG. 8 or it may be a largely conventional extruder for plastic materials such as one comprising a heated, generally tubular body with screw means for advancing the material along the body to a die, that die being either a simple orifice or where appropriate, depending upon the article to be formed, of more complex shape.

It should be appreciated that while in this particular instance the fiber separated in process 18 is shown as being returned for re-use in the same paper and board production unit 12 as the reject material originated, it is quite feasible that it could be used for other purposes. Additionally, the reject material can be obtained from more than a single production line.

Figure 2:
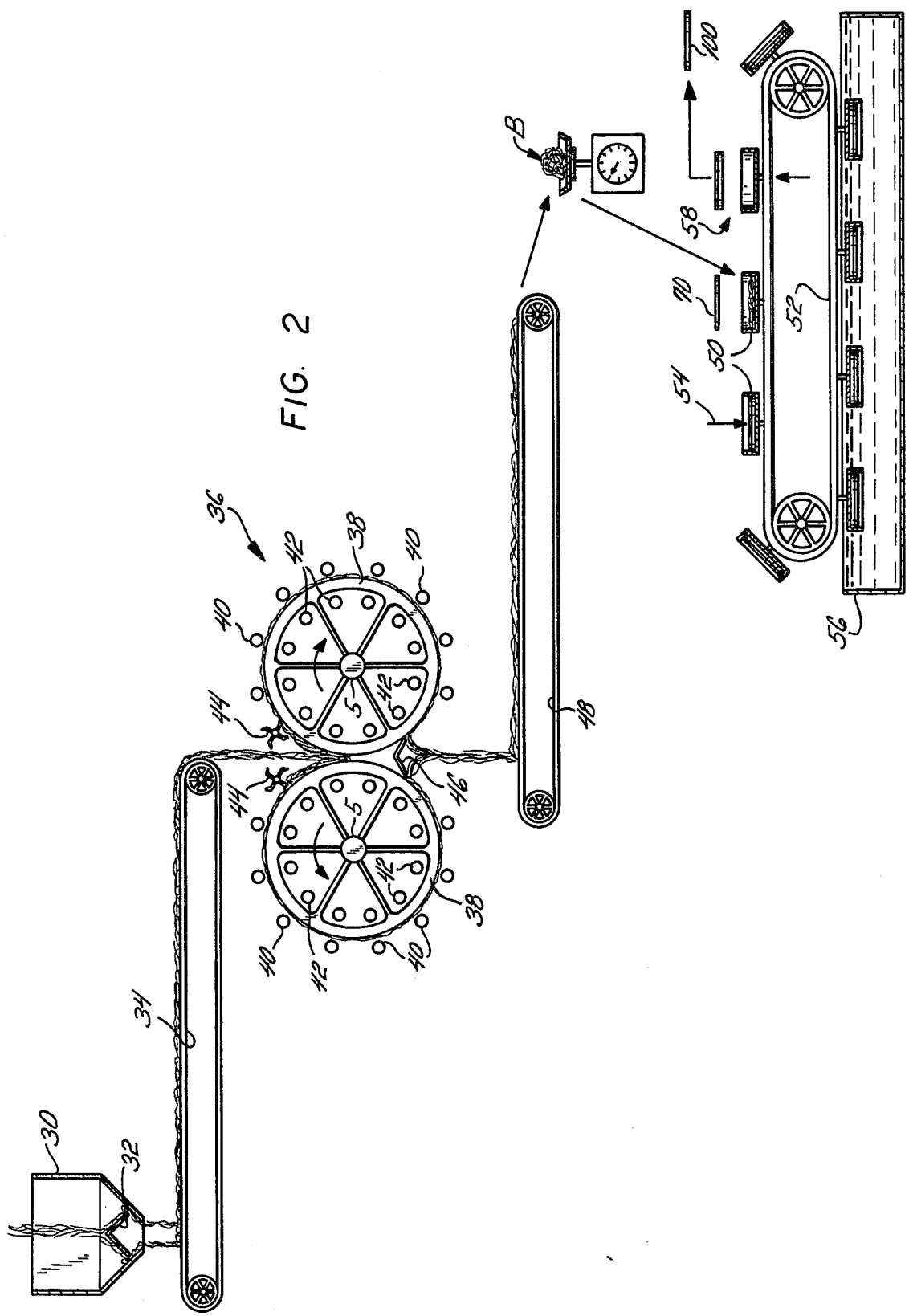
FIG. 2 shows apparatus for effecting the process of this invention.

Illustrated, schematically, in FIG. 2 is an apparatus for use in the process of FIG. 1. That apparatus comprises a hopper 30 in which is held the waste material issuing from fiber separation process 18 of FIG. 1. Disposed within the hopper is an appropriate baffle element 32 to evenly control the flow of material from the hopper to a conveyor 34. From conveyor 34 the waste material is delivered to heating apparatus generally indicated at 36 and comprising a pair of contrarotating metal drums 38 which may be driven by the same motor or may have independent drives.

Disposed around the exterior of the drums 38 are a plurality of radiant heating elements 40 and disposed within and secured to the drums to rotate therewith are a plurality of similar radiant heating elements 42. The internal heating elements 42 conveniently are supplied by means of appropriate slip rings at the hub 5 of the drums. It is to be appreciated that most desirably there will be provided heat insulating means internally and externally of the drums to reduce the power requirements for heating. It also is to be appreciated that it is feasible to have the interior heating elements 42 fixed as is the case with the external heating elements so that the drums would move relatively to those elements. In certain instances this may be considered desirable to obtain more even heating of the surface of the drum and, of course, it obviates the need for slip rings.

It will be recognized from the drawings that the material falling from the conveyor 34 falls between the drums to what is in effect the exit side of the nip defined between those drums. Because of the high temperature at which the metallic drums are maintained, the material will adhere to the surfaces of those drums to be carried away from the nip. Disposed a short distance from the nip are a pair of rotating bladed elements 44 which act to distribute the material along the axial length of the drums and to limit the thickness of the layer of material on the drums to that which can effectively be reduced to a moldable consistency.

The material adhering to the drums will be carried around the outer surface of the drums towards the entrance side of the nip and to a scraping element 46 which will detach the now paste or dough-like material from the surface of the drums and cause it to fall to a conveyor 48. It is to be understood that conveyors 34 and 48 may, if desired, be of metallic structure and heating means may be associated with them, in the case of conveyor 34 preheating the material prior to its falling to the drums 38 and in the case of the conveyor 48 to maintain a material scraped from the drums at a moldable consistency.

From the conveyor 48 a batch of moldable material indicated at B is taken by an operator, or if desired, this process can be automated, and weighed, and thereafter loaded into that one of a plurality of female molds 50 mounted upon endless conveyor 52, which is at the loading station. Thereafter, a press, indicated schematically at 54, is operated to form the molded article and the material is conveyed, most desirably through a quench bath, indicated, schematically, at 56, to an unloading station indicated at 58.

Figure 4:
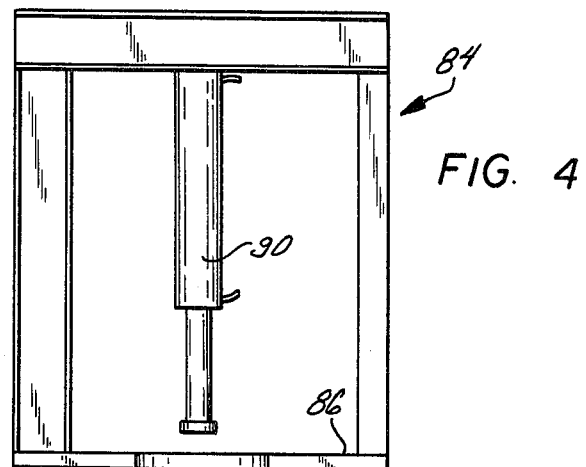
Figure 5:
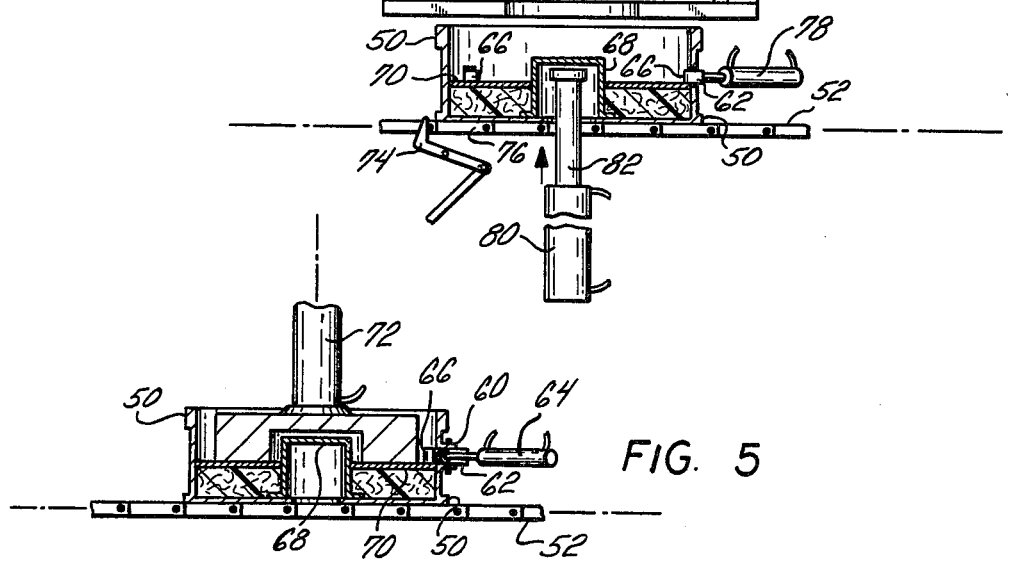

FIG. 5 shows, schematically, the molding operation. In that figure a female mold 50 is secured to endless conveyors 52, in a manner more clearly seen in, for example, FIGS. 3 and 4, and has an appropriate shape for the article which is to be molded. Pivotally disposed between ears 60, projecting to the outside of the mold 50, are latches 62, there being three such sets of ears and latches, equiangularly spaced about the female mold, only one of which is visible in the drawings.

By means of a piston/cylinder unit indicated at 64, the latches can be shifted from an unlocked position in which nose 66 of the latch is displaced from the interior of the mold 50 and a locked position in which, as illustrated in FIG. 5, the nose projects into the interior of the mold 50.

In operation, at the loading station, a core element of generally top hat section indicated at 68 is disposed centrally within the female mold. Thereafter, a batch of the moldable material obtained from conveyor 48 is disposed in the annular space between the exterior surface of the core 68 and the inner surface of mold 50. A disc-like plate 70 having a central opening to fit around core 68 is then disposed atop the material to be molded. The assembly is then moved to a press position where a hydraulic press, the ram of which is indicated at 72, is operated to bear against the disc 70 and effect molding. By any convenient means, as for example by a pressure responsive switch or by a limit switch, when the press action has been completed piston/cylinder unit 64 is operated to throw the latches 62 into the operative position illustrated in FIG. 5. Thereafter the press is retracted and the assembly of the mold with its contents, is shifted from the pressing position to be passed through the quenching bath 56 in FIG. 2.

Figure 3:
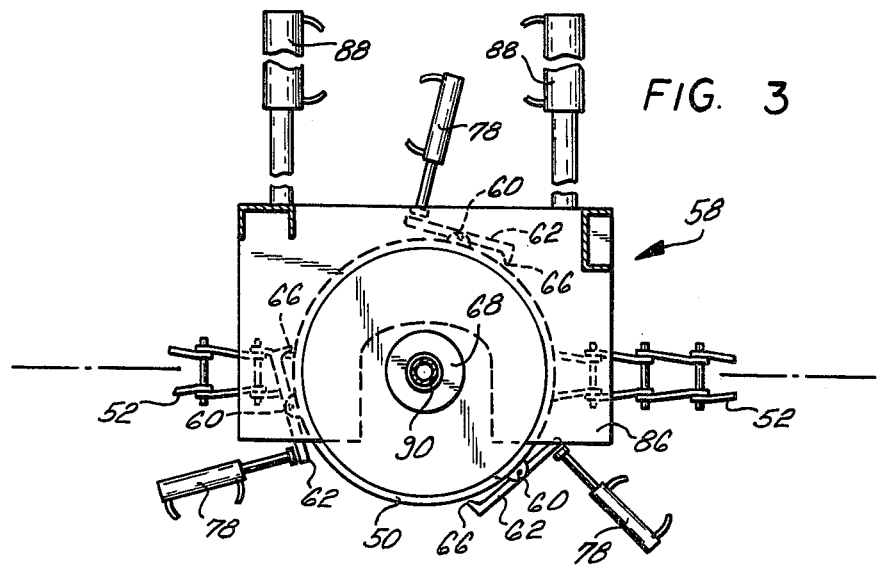
FIG. 3, FIG. 4 and FIG. 5 are details of the apparatus of FIG. 2.

The loaded mold exits from the bath and continues to unloading station 58 which is illustrated in detail in FIGS. 3 and 4. Disposed at or adjacent the unloading station 58 is the pedal operated dog 74 which can be shifted to the position shown in FIG. 4 in which it engages a link 76 of conveyor chain 52. The conveyor chain is driven by an hydraulic motor (not shown) so that the motor will turn idly while the chain is stopped holding the mold 50 at the unloading station.

Disposed to be equiangularly spaced about the mold 50 at the unloading station are three piston/cylinder units 78 which are effective when operated to shift the latches 62 to their unlocked position in which they are retracted from the interior of mold 50. When the latches 62 are unlocked a piston/cylinder unit 80 is operated to project its ram 82 into the interior of the core 68 and to lift the core and, because of the interengagement of the brim section of the core, also the molded article and disc 70, from the mold. A carriage, indicated at 84 and comprising a generally U-shaped platform 86, is then operated by horizontally disposed rams 88 to move forwardly beneath the molded article to the position shown in FIG. 3. Thereafter, vertically disposed ram 90 is operated to contact the top of the core and to press the core from the molded article back into position within the female mole while, of course, disc 70 and the molded article remains upon platform 86. Upon retraction of ram 90 the molded article can be removed from the platform 86 for subsequent treatment if appropriate, or for storage or use, and the disc 70 returned for use in the molding process once more.

It is to be appreciated that the particular molding technique here described and illustrated is exemplary of various ones which may be adopted and is one especially adapted for the production of a plug for location in the end of a roll of a paper product to protect that paper from damage during transportation. Such a plug is illustrated in FIGS. 6 and 7 and comprises a generally disc-like body 100 with a central opening 102, and a plurality of radial spokes or ribs 104 projecting from a hub portion towards a rim of the body. Formed between the hub and rim portions are a pair of concentric annular ribs 110 of lesser height, as can be seen in FIG. 7, than the rim and hub portions and a plurality of radial ribs 112 extending between the hub and rim portions and are of similar height to annular ribs 110.

As can be seen particularly in FIG. 7, a small shoulder 114 is formed at the rim to provide a stop for cooperation with the end of a cylindrical package of a paper product into which the plug is inserted.

The conventional plug used for this purpose is formed of wood, generally of plywood and these items are rather costly and are easily damaged. The utilization of the mixture of a fibrous product and the synthetic plastic material for the production of such a plug, besides the fact, of course that it utilizes what has heretofore been considered a waste product, is particularly desirable for use as a plug since it has a memory and therefore can absorb abuse and regain its shape and it is extremely durable.

The great majority of the synthetic plastic materials utilized in the present invention will be polyolefins, particularly polypropylene and polyethylene, but, of course, there are other materials such as, for example, polyvinylchloride which are usable with effect. The surfaces of the heating drums are maintained at such a temperature and are rotated at a speed to maintain the material falling onto them for a period such that the material attains a temperature between about 93° and 310° C by the time it is removed from the rolls. It will be appreciated that the temperature to which the material is raised is one which allows effective and economical molding without the production of undue amounts of fumes and, of course it will be recognized that the temperature will be selected for the particular material being processed and can be adjusted by adjusting the temperature of the drums or the speed of rotation of the drums to maintain the material on the surface of the drums for a greater length of time.

Generally the molded material of the present invention comprises about 80–95% of synthetic, thermoplastic material, about 5–20% of cellulose and metallic foil. The material may, of course, include varying quantities of mineral pigments, sizing agents and other contaminants.

Clearly, depending upon the particular process involved, the proportions may vary considerably and, of course, appropriate adjustments can be made to accommodate different materials both as to heating levels and molding pressures.

Illustrated schematically in FIG. 8 is an alternate apparatus which has been used to replace the heating apparatus indicated as 36 in FIG. 2. In this alternate apparatus the waste material is delivered to the heating apparatus through hopper 120 and metering device 122. The material falls onto metallic belts 124 and 126. These belts, desirably, are individually driven, and may operate at the same speed or at different speeds, depending upon the effect desired.

Above and between the steel belts 124 and 126 are radiant heating elements 128. This apparatus is appropriately insulated, both internally and externally, to reduce the power requirements for heating.

The waste material dropped onto conveyor 126 mixes with the waste material dropped onto conveyor 124 at point 130.

The semi-soft waste material is removed from the metal belts by scrappers 132 and falls onto the metal belt conveyor 134. This is the same conveyor 48 in FIG. 2. After the material has been melted and dropped onto conveyor 134, the balance of the process is the same as indicated in FIG. 2 and being subject to the several variations discussed with regard to the apparatus of that figure. Adjustments in the speed and temperature of the belts can be made to raise the temperature of the material to that desired.

It will also be recognized that the apparatuses here described may be used in the processing of waste or byproduct thermoplastic materials which are derived from a process in which those materials will not be contaminated by a fibrous material but are contaminated by dyestuffs or other additives which according to practice have precluded their re-use. In such cases, molded articles can be produced which would not include a fibrous material but most desirably a fibrous material would be added to improve the strength of the article, that fibrous material preferably being a by-product of a main and possibly different process than the one from which the thermoplastic material is derived.

What is claimed is:

1. Method of producing a molded article of desired shape from a by-product of a process producing a paper product having a thermoplastic material coating said by-product comprising a thermoplastic material impregnated with a fibrous material, comprising:
   a. separating a portion of the fibrous material from said by-product;
   b. returning said portion of separated fibrous material to said paper product process;
   c. delivering the remaining portion of said thermoplastic material and fibrous material to the exit side of a nip defined between a pair of contra-rotating heated drums to heat and render said remaining materials plastic, and to cause said remaining materials to adhere to the surfaces of said drums, and to be carried thereon from said exit side of said nip towards the entrance side of said nip;
   d. removing said adhered plastic remaining materials from the surfaces of said rotating drums at a location adjacent the entrance side of said nip;
   e. delivering said plastic remaining materials to a molding means; and
   f. molding said plastic materials to a desired article shape.

* * * * *